US005515119A

United States Patent [19]

Murdock et al.

[11] Patent Number: 5,515,119

[45] Date of Patent: May 7, 1996

[54] SYSTEM FOR VARYING LIGHT INTENSITY SUCH AS FOR USE IN MOTION PICTURE PHOTOGRAPHY

[75] Inventors: Nolan J. Murdock, Valencia; Felipe Navarro, Granada Hills, both of Calif.

[73] Assignee: Panavision International, L.P., Tarzana, Calif.

[21] Appl. No.: 217,898

[22] Filed: Mar. 25, 1994

Related U.S. Application Data

[63] Continuation-in-part of Ser. No. 887,276, May 22, 1992, Pat. No. 5,371,655.

[51] Int. Cl.[6] .......................... G03B 29/00; G03B 15/02

[52] U.S. Cl. .......................... 352/131; 352/244; 362/18; 362/293; 362/323; 354/126; 359/888

[58] Field of Search .......................... 362/16, 17, 18, 362/293, 343, 323, 324; 356/418, 419; 359/888; 354/126, 141; 352/131, 244

[56] References Cited

U.S. PATENT DOCUMENTS

| | | | |
|---|---|---|---|
| 1,820,899 | 8/1931 | Greenewalt | 362/231 |
| 2,748,248 | 3/1957 | Rackett | 352/88 |
| 3,538,825 | 10/1970 | Taylor | 362/18 |
| 3,883,243 | 5/1975 | Weiglass et al. | 355/35 |
| 4,015,113 | 3/1977 | Gottschalk | 240/41.35 R |
| 4,232,359 | 11/1980 | Leon et al. | 362/268 |
| 4,323,952 | 4/1982 | Proske | 362/17 |
| 4,325,083 | 4/1982 | Rouchon et al. | 358/228 |
| 4,392,187 | 7/1983 | Bornhorst | 362/233 |
| 4,527,198 | 7/1985 | Callahan | 358/185 |
| 4,535,394 | 8/1985 | Dugre | 362/231 |
| 4,600,976 | 7/1986 | Callahan | 362/277 |
| 4,602,321 | 7/1986 | Bornhorst | 362/268 |
| 4,800,474 | 1/1989 | Bornhorst | 362/293 |
| 4,890,208 | 12/1989 | Izenour | 362/294 |
| 4,891,738 | 1/1990 | Richardson et al. | 362/282 |
| 4,893,225 | 1/1990 | Solomon | 362/293 |
| 4,897,770 | 1/1990 | Solomon | 362/293 |
| 4,914,556 | 4/1990 | Richardson | 362/293 |
| 4,958,265 | 9/1990 | Solomon | 362/293 |
| 4,972,306 | 11/1990 | Bornhorst | 362/278 |
| 4,984,143 | 1/1991 | Richardson | 362/293 |
| 5,293,542 | 3/1994 | Ise et al. | 358/228 |

FOREIGN PATENT DOCUMENTS

| | | |
|---|---|---|
| 0018874 | 11/1980 | European Pat. Off. . |
| 2465155 | 3/1981 | France . |
| 8802996.4 | 9/1983 | Germany . |
| 3609947A1 | 1/1987 | Germany . |
| 821605 | 10/1959 | United Kingdom . |
| 2031138 | 4/1980 | United Kingdom . |

OTHER PUBLICATIONS

Catalog from Reynard Enterprises, Inc., Laguna Niguel, California, pp. 30–31 (no date).

*Primary Examiner*—Michael L. Gellner
*Assistant Examiner*—Eddie C. Lee
*Attorney, Agent, or Firm*—Lyon & Lyon

[57] ABSTRACT

A lighting system and method with variable light intensity for use in motion picture photography. In the lighting apparatus, light emitted from a source is passed through an aperture and then through a section of a movable, neutral density filter. The preferred filter is specially designed to have a variable density, continuously increasing from one side of the filter to the other. By changing the position of the filter, selectively placing higher or lower density sections in the light path, the intensity of the light emitted by the lighting apparatus may be varied. The neutral density filter is selected to be generally color neutral so that the color quality of the light passing therethrough remains unchanged. To ensure complete light blockage, a douser of opaque material is provided which is selectively interposed in the outgoing light path.

31 Claims, 4 Drawing Sheets

FIG. 1.
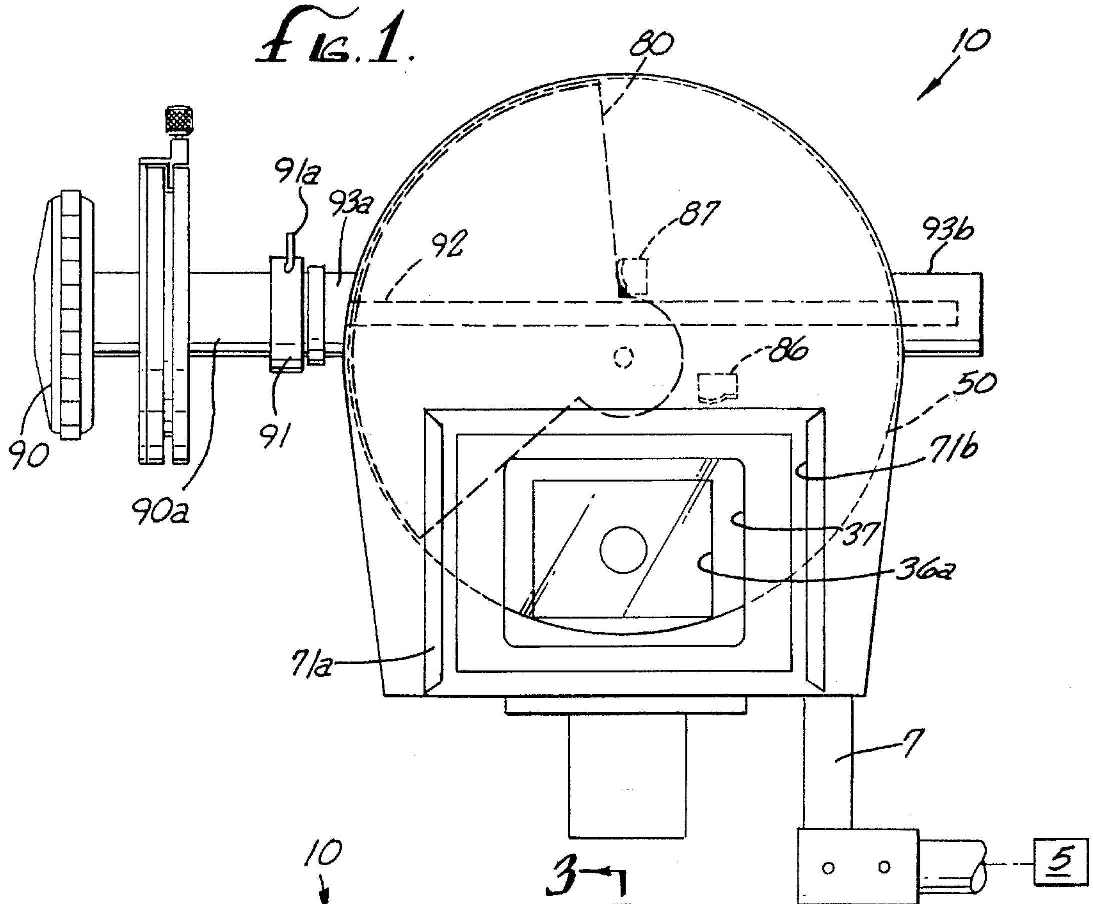
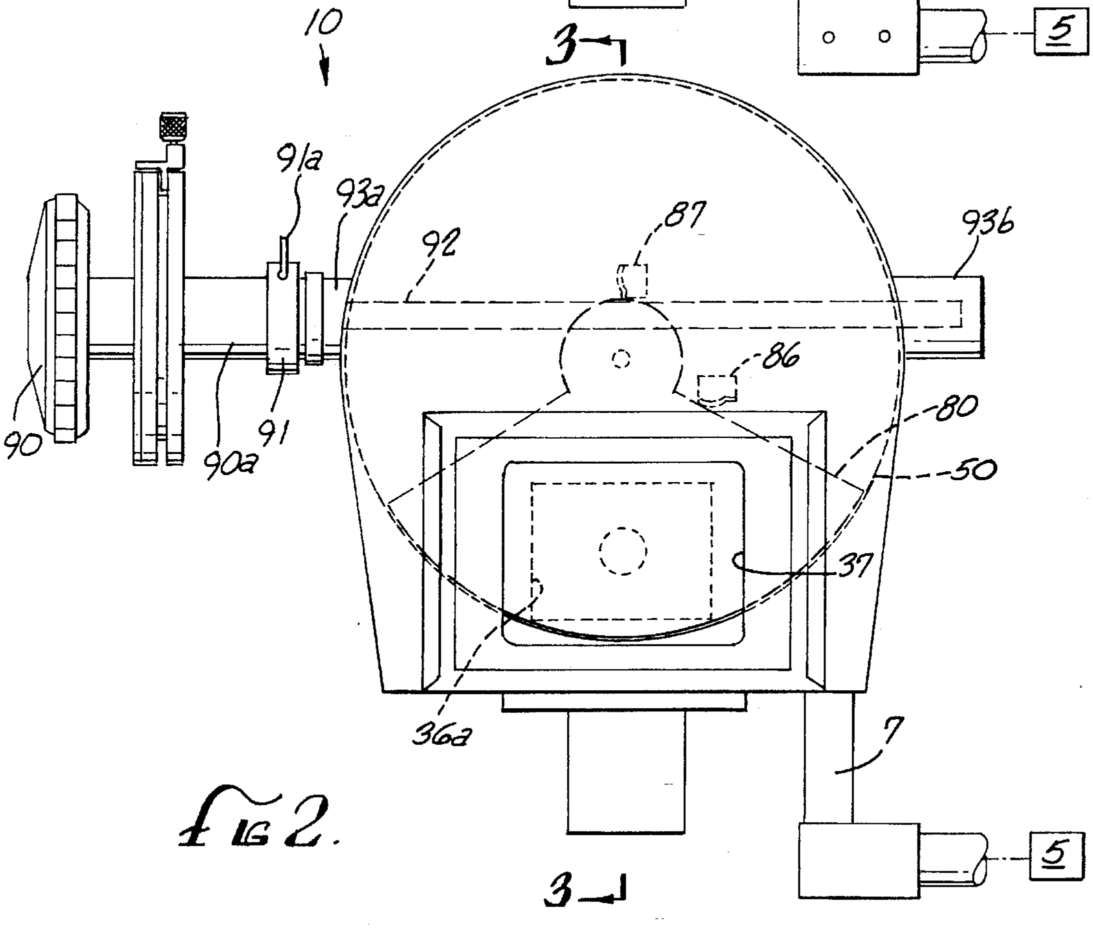
FIG. 2.

FIG. 4a
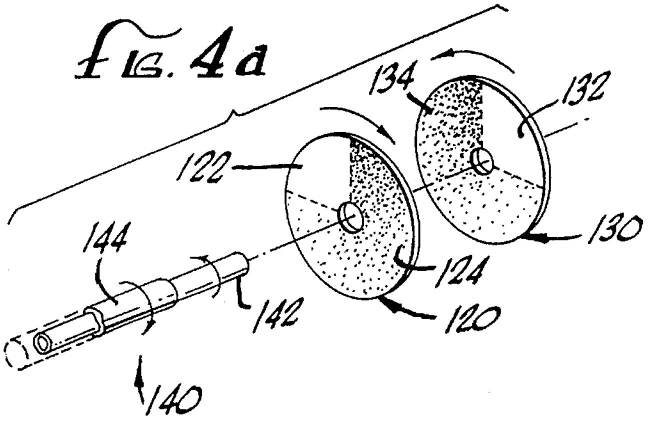
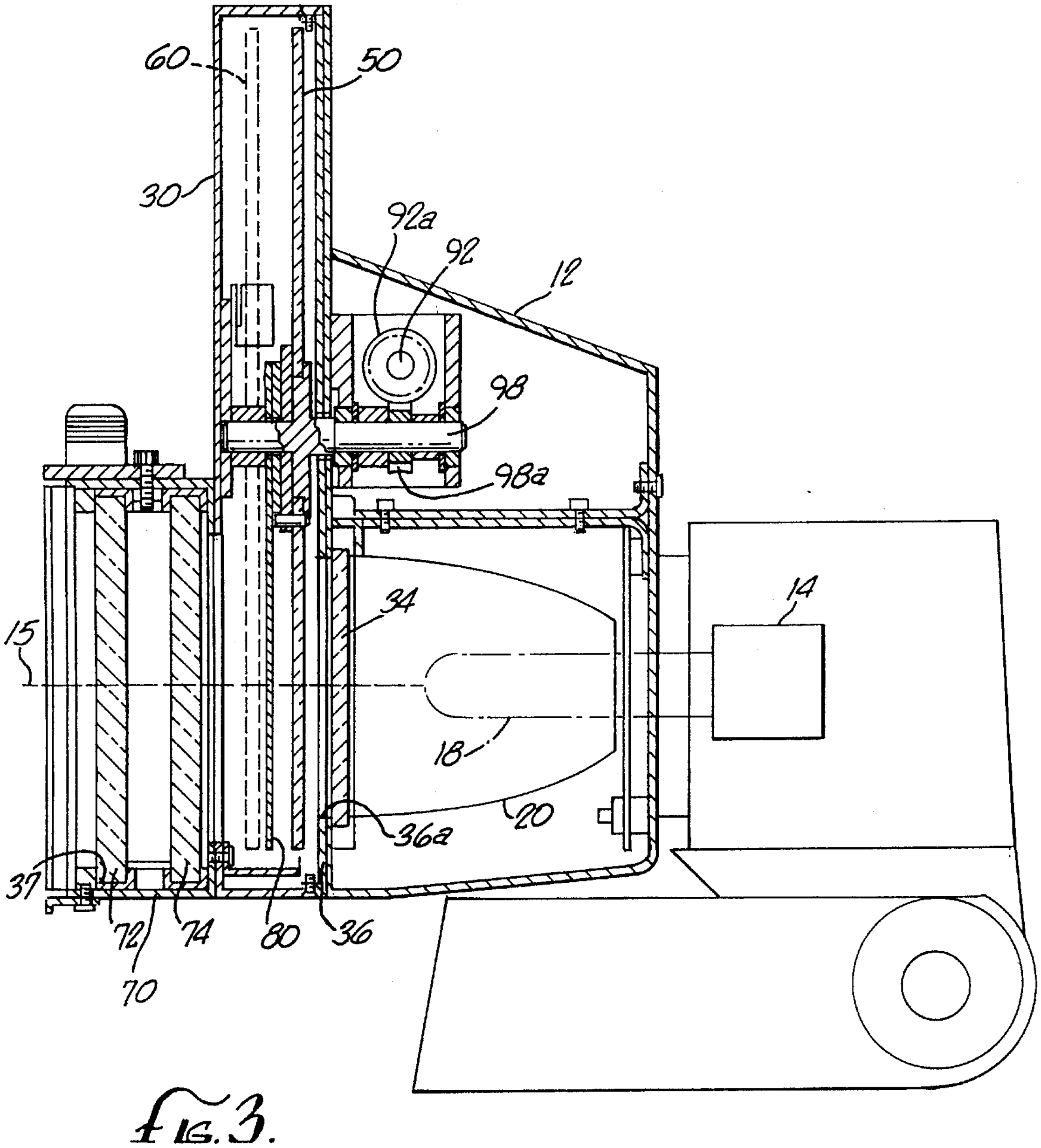
FIG. 3.

6
6
30
34
36
36a
37
50
52
53
54
56
70
71a
71b
72
74
80
81
81a
82
83
83a
83b
84
85
86
87
88
89
90
92
92a
92b
93b
94
95
95b
96
97
98
99
100
110
115

SYSTEM FOR VARYING LIGHT INTENSITY SUCH AS FOR USE IN MOTION PICTURE PHOTOGRAPHY

RELATED APPLICATION DATA

This is a continuation-in-part of application Ser. No. 07/887,276 filed May 22, 1993, U.S. Pat. No. 5,371,655.

BACKGROUND OF THE INVENTION

The field of the present invention relates to lighting apparatus such as may be particularly used for varying the intensity of light produced by a light source for use in motion picture photography such as film and video.

In a motion picture production, it is often advantageous to vary the amount of light on a subject. One such occurrence is when a subject is moved progressively closer to the camera and light source during filming. When employing an artificial light source, the intensity may be varied by changing the power input to the light such as through a rheostat. However as the light intensity is varied, the color quality or color temperature is also varied. Though such color change may not be perceptible to the human eye, color film is easily affected by color quality change.

U.S. Pat. No. 4,015,113 discloses a variable intensity light source in which light from a lighting element is directed against a reflector. The reflector has adjustable degrees of reflectivity being comprised of a plurality of rotatable cylindrical rollers, each roller having half of its surface coated with a black, nonreflective material. As the rollers are rotated, the intensity of light may be varied without changing color temperature. Other devices have included shutter elements interposed in the light path, the elements opening or closing to vary the amount of light transmitted or reflected.

The present inventors have disclosed in their application Ser. No. 07/887,276, U.S. Pat. No. 5,371,655, a lighting apparatus in which light emitted from a source is passed through an aperture and then through a section of a movable, neutral density filter. The filter is specially designed to have a variable density, continuously increasing from one side of the filter to the other. By changing the position of the filter, selectively placing higher or lower density sections in the light path, the intensity of the light emitted by the lighting apparatus is varied. The neutral density filter is selected to be generally color neutral so that the color temperature of the light passing therethrough remains unchanged. The present inventors have recognized that the darkest portion of the neutral density filter may not be sufficiently dark and may allow some light to pass therethrough.

SUMMARY OF THE INVENTION

The present invention relates to a lighting apparatus and method for varying the light intensity, including complete light shutoff, from a light source for use in motion picture photography such as for film and video. In the lighting apparatus, light emitted from a source is passed through an aperture and then through a section of a movable, neutral density filter. The preferred filter is specially designed to have a variable density, continuously increasing from one side of the filter to the other. By changing the position of the filter, selectively placing higher or lower density sections in the light path, the intensity of the light emitted by the lighting apparatus may be varied. The neutral density filter is selected to be generally color neutral so that the color quality of the light passing therethrough remains unchanged. To ensure complete light shutoff, as the highest density portion is placed in the light path, a blocking plate or douser is then successively moved in front of the aperture until the aperture is completely blocked off by the douser.

BRIEF DESCRIPTION OF THE DRAWINGS

FIG. 1 is a side elevation view of a light apparatus according to a preferred embodiment of the present invention;

FIG. 2 is a side elevation view of the light apparatus of FIG. 1 with the douser in the blocking position;

FIG. 3 is a cross sectional view of FIG. 2 taken along line 3—3;

Figures 4, 5, 6:
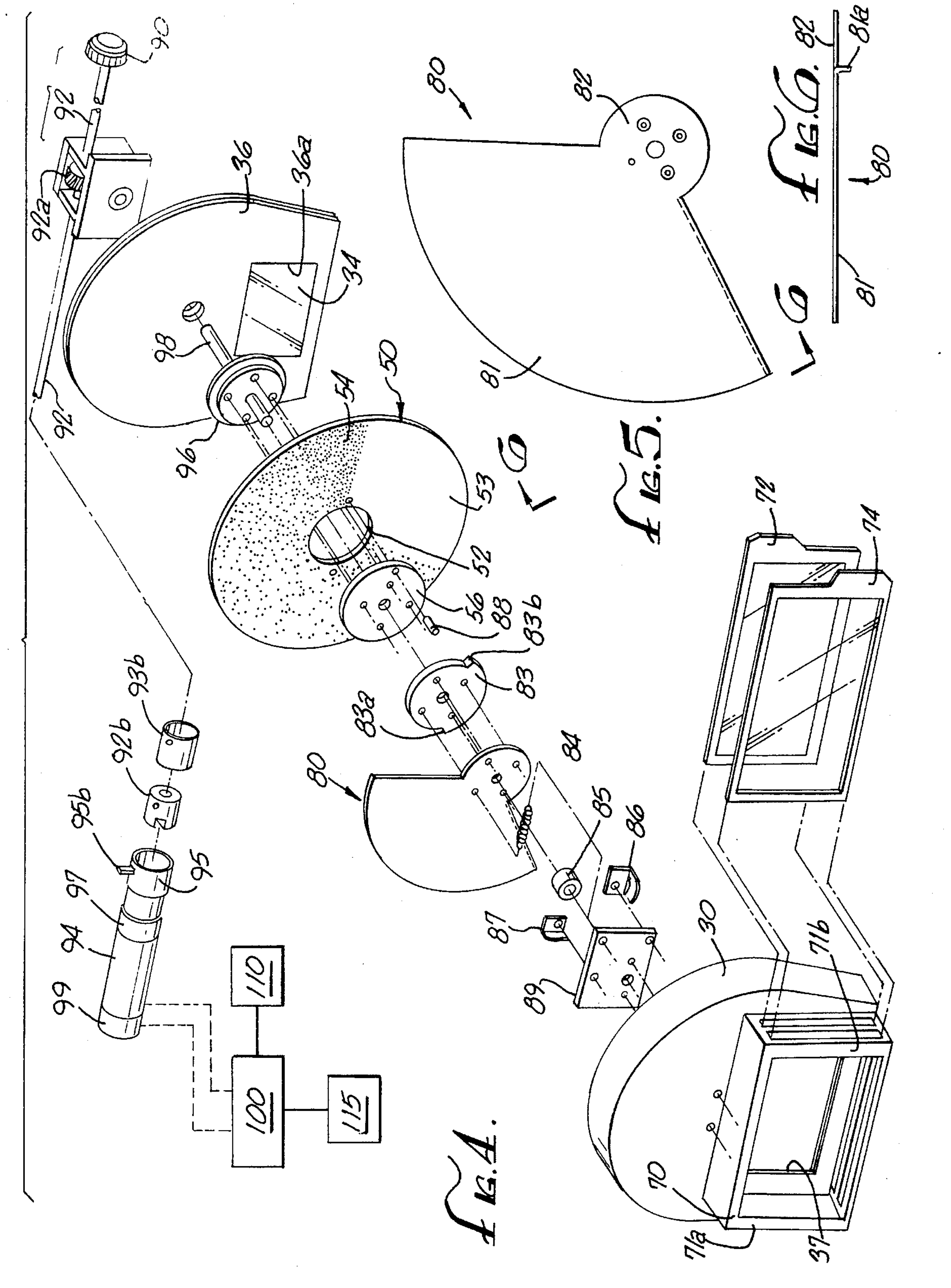
FIG. 4 is an exploded perspective view of the light apparatus of FIGS. 1–3.
Figure 8:
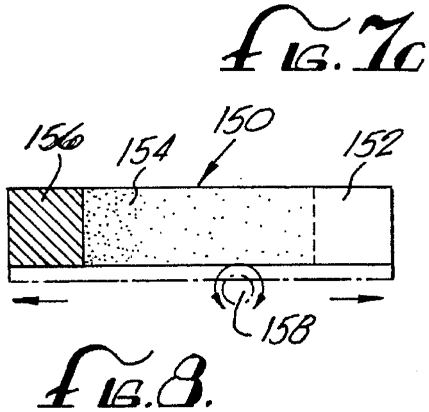
Figure 9:
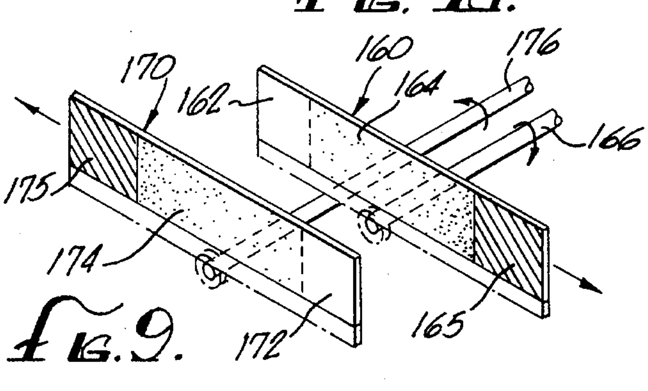

FIG. **4*a*** is a diagrammatic view of an alternate embodiment comprising a dual disk design;

FIG. 5 is a detailed plan view of the douser element of FIG. 4;

FIG. 6 is a cross sectional view of FIG. 5 taken along line 6—6;

FIGS. **7*a*–7*d*** are diagrammatic plan views of the rotating douser and filter showing relative positions thereof at four different settings;

FIG. 8 is an alternate embodiment for the variable density filter with douser comprising a rectangular design; and FIG. 9 is another alternate embodiment for the variable density filter with douser comprising a dual rectangular design.

DETAILED DESCRIPTION OF THE PREFERRED EMBODIMENT

The preferred embodiment will now be described with respect to the drawings. To simplify the description, any numeral identifying an element in one figure will represent the same element in any other figure.

FIGS. 1–6 illustrate a lighting apparatus 10 which is mountable by a bracket 7 to suitable supporting location such as camera 5. The lighting apparatus 10 includes a main housing 12 with a front wheel housing 30 and a filter housing 70. A barn door assembly (not shown) may be attached to the front thereof.

Light is emitted from light source 18, which is typically an electric lamp. Typically, professional light sources employ a halide-metal (HMI) element, a xenon element, or a more standard lower output incandescent lamp. The light source 18 is positioned in the center of a reflector 20 which directs light from the light source 18 out along an outgoing light path 15 (see FIG. 3). The relative axial position of the lighting element 18 to the reflector 20 may be adjusted by a suitable adjustment mechanism such as axially translating the socket carrier of the light source 18 to adjust the relative position of the lamp 18 to the reflector 20 for focusing of the outgoing light beam along light path 15.

Light from the lamp 18 and the reflector 20 passes through a heat shield 34 which is typically a glass element designed to permit unaffected transmission of light but inhibit transmission of heat therethrough. Upon exiting heat shield 34, the light then passes through an aperture **36*a* in the back plate 36. The aperture 36*a* is a rectangular aperture of desired dimensions. The light then passes through a neutral density filter disk 50 positioned in front of the aperture 36*a***.

The filter disk 50 is preferably a neutral density filter which is positioned so that light exiting through aperture 36*a* passes through a lower section of the neutral density filter disk 50. The disk 50 has a center hole 52 and is mounted to shaft 98 and flange 96 by a retainer ring 56. The disk 50 is rotatable through rotation of shaft 98. The disk shaft 98 is rotationally operated through a gear 98*a* which is alternately operated through drive shaft 92 either manually by turning of knob 90 or electrically run by a motor 94.

The drive shaft 92 is operable on either side of the housing 12 through operation of knob 90. The knob 90 along with the tubular shaft 90*a* may be removed from stub 93*a* by turning lever 91*a* thereby releasing locking collar 91 and then reinstalling the locking collar 91, tubular shaft 90*a* and knob 90 on stub 93*b* on the other side of the main housing 12.

Alternately, a motor 94 may operably connected to the drive shaft 92 by a transmission shown generally by numeral 97. The transmission 97 is releasably connected to the stub 93*b* by locking collar 95 via slotted element 92*b*. By turning lever 95*a* on locking collar 95, the locking collar 95 is released from or locked onto the stub 93*b* and slotted element 92*b*. The operation of the motor 94 is controlled by a controller 100 which in turn is operable from a signal transmitter 110 described in more detail below. The controller 100 is also in communication with a transducer/limiter 99 which provides a signal indicating the angular position of the drive shaft 92 and consequently the angular position of the shaft 98 and the disk 50.

The neutral density disk 50 is preferably designed as shown in FIGS. 4 and 7*a–d* to have a clear section 53 over about a 90° arc, the clear section having a relative density of approximately zero, and an increasing neutral density section 54 over a 270° arc. Over an angular position of about 270°, the relative density of the neutral density section 54 of disk the 50 (at a given polar position) increases linearly from approximately zero to a relative density of about 2.0. In a preferred embodiment, the relative density increases linearly from approximately zero to approximately 3.0. The neutral density filter disk 50 linearly attenuates light passing therethrough with the relative angular disk position disk providing increasing or decreasing attenuation as a higher or lower density disk section is positioned in front of the aperture 36*a* through which the light passes.

The neutral density filter medium is preferably designed to be relatively color neutral meaning that light passing therethrough does not change in color quality or color temperature.

In the preferred application, the neutral density disk 50 has an outside diameter 175 mm and an inside center hole 52 of approximately 25.4 mm. The disk 50 is preferably constructed with a Pyrex™ (or equivalent material) substrate which is coated with neutral density filter material to achieve a design with the desired light transmission characteristics. Alternately the substrate may be comprised of fused silica which is also a material which has a low thermal expansion coefficient and high thermal shock value. The disk 50 is preferably designed to attenuate light without causing change in color quality or color temperature. Such a disk is available from Reynard Enterprises, Inc. of Laguna Niguel, Calif., U.S.A.

In an alternative configuration, the signal element 110 and/or the controller 100 may be connected both to the motor 94 and another system actuator 115 such as the motor for the lens focusing system. The lighting apparatus control and the lens focusing system control each have two channels, each having control ranges separately sat. For example, a system may be calibrated with one end of the controller range setting the lighting apparatus at 20% intensity and the lens focus at 1 meter, the other end of the range being calibrated to be 80% for the lighting apparatus and the lens focus at 10 meters. Points in between the two limits are then interpolated by a suitable algorithm. Such a system allows for automatic adjustment of light intensity as the lens is focused tracking the change in the distance to the subject.

The signal element 110 such as a signal emitter may be a rotatable dial mounted on the lighting apparatus 10 itself or may be a radio-controlled apparatus located at some distance from the lighting apparatus 10. In the preferred configuration, a signal produced from the actuator 115 may be taken from a camera lens focus mechanism such that the light intensity may be automatically varied as the camera lens is focused. In the application where a subject is moving toward or away from the camera, the camera operator is continually adjusting the focus of the camera lens. With the signal element 110 tied into the camera lens focus mechanism, the signal provided to the controller 100 from the signal element 110 permits automatic adjustment of the light intensity to compensate for the changing distance of the subject to the camera.

The signal element 110 may be any desired signal generator providing a signal to controller 100 such as an electronic or radio-controlled actuator. Though a conventional analog signal may be used, a digitized signal may be employed to provide more precise control. The actuator 115 may be any suitable mechanism including a lens focus mechanism, a lens aperture adjustment device, camera shutter opening control device, or an automatic light exposure device.

After passing through the neutral density disk 50, the light may be passed through a second rotatable element such as a color temperature correction wheel or another neutral density filter wheel. The second rotatable element is described in Applicants' prior application Ser. No. 07/887,276 filed May 22, 1993, now U.S. Pat. No. 5,371,655, herein incorporated by reference. For example FIG. 4*a* illustrates an alternative embodiment having two neutral density disks 120, 130 replacing the single neutral density disk 50 of the previous embodiment with a pair of disks 120, 130. The primary and secondary filters 120, 130 are mounted on a shaft 140 having an internal rotational element 142 and an external rotational element 144. The primary filter disk 120 has a clear section 122 and a linearly increasing neutral density section 124. Similarly, the secondary filter disk 130 has a 90° clear section 132 and a 270° gradually linearly increasing neutral density section 134. The primary filter disk 120 is mounted on the outer shaft element 144 and the secondary filter disk is mounted on the inner shaft element 142. The disks 120, 130 are counter-rotated and the neutral density sections 124, 134 are configured in opposite orientations so that during counter-rotation of the two disks 120, 130 there will be in summation approximately equal attenuation from left to right across the aperture 36*a*.

The values of color temperature correction may be selected dependent upon the particular application. For example, a typical lamp for a lighting apparatus is a halide metal variety in which the color temperature of a new lamp ranges from approximately 5600°–6000° K. As the lamp ages, the color temperature drops such that after approximately 300–500 hours of use, the color temperature of the light produced has dropped to such a degree that it is unusable. The color temperature correction wheel filter will correct for this change in color temperature by allowing the user to rotate the color correct wheel thereby selectively positioning a gradually increasing (or decreasing) color quality correcting effect in the outgoing light path. Such a disk is also available from Reynard Enterprises, Inc. of Laguna Niguel, Calif. A color temperature correction wheel may also be used to select the desired color temperature of light produced by the lighting apparatus 10 to provide desired lighting effects and to match or tune the light of the lighting apparatus 10 to other filming light sources. The color correct wheel 60 may be remotely controlled or otherwise linked to a desired output control. For example, the position of the color temperature correction wheel may be automatically adjusted to correct to correspond to lamp temperature or some other lighting factor.

Once past the second disk 60, light passes through a second aperture 37 and out through a conventional filter housing 70 in which a plurality of rectangular filters 72, 74 may be inserted. A conventional set of barn doors (not shown) positioned on the outer portion of the filter housing 70 may be equipped to provide the desired aiming effect.

In the application where there is a single neutral density filter disk 50 providing light attenuation, it would appear that because the filter is of higher density on one side of the aperture **36*a* than on the other side of the aperture 36*a* that light impinging on a subject might be darker on one side, such as darker on the left and lighter on the right. To correct for such an effect, the filters 72 and/or 74** may comprise a diffuser which will reflect and diffuse the light so as to compensate for any intensity imbalance across a light plane.

Tables A, B, and C show test results of measured light intensities from a lighting apparatus as illustrated measured at a projection screen 6 feet (1.8 meters) and 12 feet (3.6 meters) from the lighting apparatus. For example, as shown in Table A, without a diffuser, at 50% attenuation the measured light intensity varies from 21 lumens on the left to 15 lumens on the right (at a distance of 6 feet (1.8 m)). Placing a single diffuser in position (downstream of the neutral density filter), Table B shows at 50% attenuation the relative intensity on the left is 9 lumens while the relative intensity at the right is 8.2 lumens. Such an intensity variation is within acceptable limits. Such a device, therefore, requires only a single neutral density filter disk resulting in an apparatus of minimum size, weight and cost. Placing a second diffuser in position (downstream of the neutral density filter), Table C shows at 50% attenuation the relative intensity on the left is 4.5 lumens while the relative intensity at the right is 4.6 lumens (at a distance of 6 feet (1.8 m)). With two diffusers, side to side intensity variation is essentially eliminated.

TABLE A

| Without diffuser | | | |
|---|---|---|---|
| FILTER DENSITY | POSITION | | |
| (%) | Center | 2.1 meter left | 2.1 meter right |
| DISTANCE = 6 ft. (1.8 m) | | | |
| 0% | 67 (lumens) | 31 | 33.4 |
| 50% | 33 | 21 | 15 |
| | Center | 2.5 meter left | 2.5 meter right |
| DISTANCE = 12 ft. (3.6 m) | | | |
| 0% | 17.4 | 8 | 9.5 |
| 50% | 8.7 | 5.8 | 3.4 |

TABLE B

| With one diffuser | | | |
|---|---|---|---|
| FILTER DENSITY | POSITION | | |
| (%) | Center | 2.1 meter left | 2.1 meter right |
| DISTANCE = 6 ft. (1.8 m) | | | |
| 0% | 30 (lumens) | 13.6 | 14 |
| 50% | 17 | 9 | 8.2 |
| DISTANCE = 12 ft. (3.6 m) | | | |
| 0% | 7.7 | 3 | 4 |
| 50% | 3.9 | 1.9 | 1.9 |

TABLE C

| With two diffusers | | | |
|---|---|---|---|
| FILTER DENSITY | POSITION | | |
| (%) | Center | 2.1 meter left | 2.1 meter right |
| DISTANCE = 6 ft. (1.8 m) | | | |
| 0% | 16.3 (lumens) | 8.6 | 9.1 |
| 50% | 8.8 | 4.5 | 4.6 |
| DISTANCE = 12 ft. (3.6 m) | | | |
| 0% | 4.3 | 2.0 | 2.5 |
| 50% | 2.2 | 1.1 | 1.2 |

Though the examples illustrated in the tables refer to side to side attenuation variation, the diffusers also compensate for variation in the vertical direction.

Alternately, if the side to side (in the illustrated example left to right) unevenness in attenuation becomes too critical, two neutral density disks may be provided replacing the single neutral density disk 50 of the previous embodiment with a pair of disks. The first and second disks may be counter-rotated with the respective neutral density sections of the disks configured in opposite orientations so that during counter-rotation there will be in summation approximately equal attenuation from left to right across the aperture **36*a***.

Though a disk-shaped color correct wheel is the preferred geometry, other geometries may be suitable depending upon the particular application. For example, the color correct filter may also be rectangular. Alternately, if the side to side (in the illustrated example left to right) unevenness in attenuation becomes too critical, two color correcting filters may be employed in a suitable configuration.

It has also been determined that the relative density of the denser section of the neutral density filter may not provide sufficient light blocking capacity. In such an instance, the lighting apparatus 10 is equipped with a douser or blocking shroud 80 which selectively rotates into the light path 15, completely blocking the passage of light. The douser 80 is a plate of light impervious or opaque material (such as metal or alternately an opaque coating on a suitable substrate) rotatably mounted on the shaft 98. The douser 80 includes a central portion 82, which is attached to disk 83, and an arcuate section 81 scanning an arc of about 120°. As the disk 50 is rotated, interposing a darker section into the light path 15, the pin 88 mounted to the retainer ring 56 contacts the ledge **83*a* thereby rotating the douser 80 to place the arcuate section 81 in the light path 15 completely blocking off light passage. A spring 84 attached at opposite ends thereof to the douser plate 80 and the connector plate 89 (which is in turn connected to the housing 30) spring loads or rotationally biases the douser plate in a clockwise direction (as viewed from the front as in FIG. 4) against the stop 87. A spacer 85 positioned in the shaft 98 holds the douser 80 in the desired positioned behind the front cover of the housing 30**.

As shown in FIG. 6, the douser plate 80 has an angled side edge 81*a*. Referring to FIGS. 1 and 2, the motion of the douser plate 80 is limited to rotating about 120° between the stops 86, 87. The angled side edge 81*a* also forms a baffle against the disk 50 to prevent light from bypassing the douser 80 as described below.

Figure 7A:
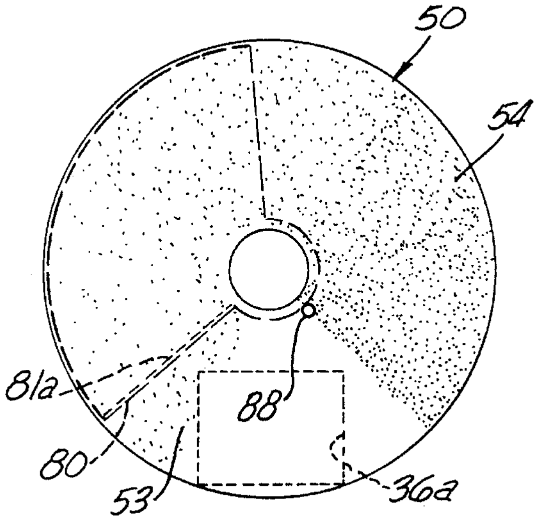
Figure 7B:
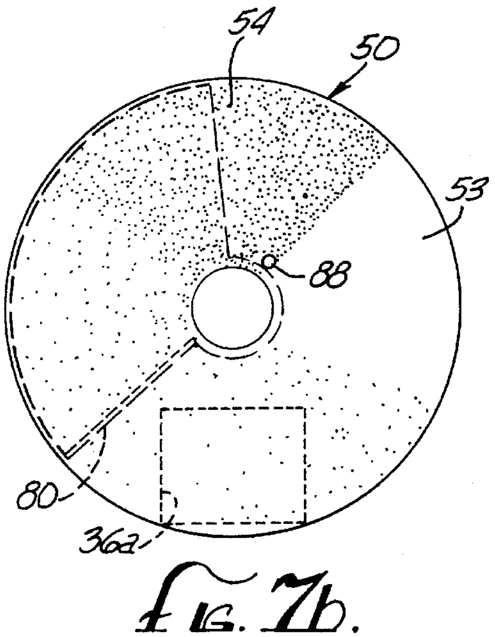
Figure 7C:
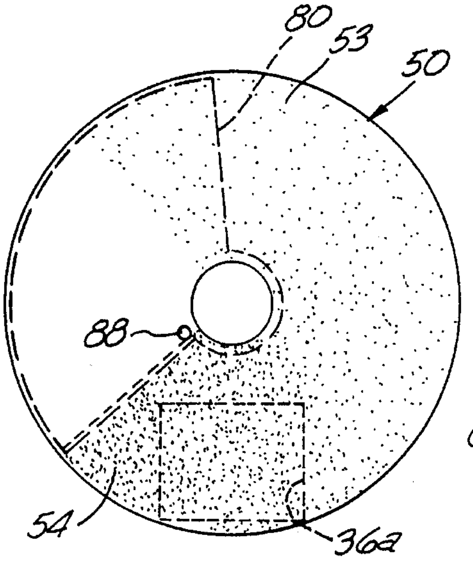
Figure 7D:
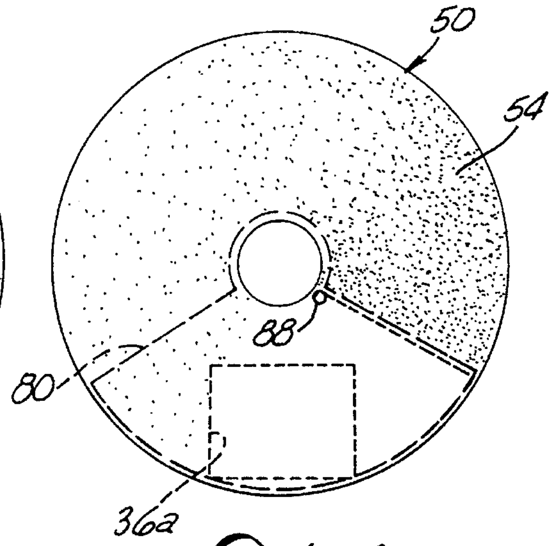

The operation will now be described with reference to FIGS. 7*a*–7*d*. Upon turning of the shaft 98, the filter disk 50 is rotated placing a desired density section of the disk in front of the aperture 36*a*. In FIG. 7*a* the clear section 53 of the disk 50 is positioned in front of the aperture allowing a maximum amount of light to be passed therethrough. As the disk 50 is rotated about 90° (counterclockwise) to the position shown in FIG. 7*b*, the portion of the disk 50 in front of the aperture through which the light from lamp 18 must pass, becomes progressively more dense reducing the light intensity passing therethrough. As the disk 50 is rotated another 90° (counterclockwise) to the position shown in FIG. 7*c*, the portion of the disk 50 in front of the aperture 36*a* continues to become progressively more dense. As the disk 50 is rotated further, the pin 88 contacts the ledge 83*a* and begins to rotate the douser 80 until the shaft 98 has been rotated a full 180° and the douser 80 is completely blocking the aperture 36*a* as shown in FIG. 7*d*. At the position in FIG. 7*d*, the leading edge of the douser 80 will halt at the stop 86. Reversing rotation of the shaft 98, the spring 84 urges the douser against the pin 88 following the pin as it rotates the douser back to its original position as in FIG. 7*a*.

As shown in FIGS. 7*a*–7*d*, the douser 80 not only provides complete light blockage (when in position shown in FIG. 7*d*) but also enables light control over a greater range than without the douser. This greater range is made possible because at the end of the darkened position, the douser 80 covers any portion of the clear section 53 which becomes aligned with the aperture 36*a*. Therefore, light intensity reduction is accomplished all the way to position of FIG. 7*d* where without the douser, adjustment would reach a maximum darkened position just before the clear section 53 reaches any alignment with the aperture 36*a*. The douser 80 provides a greater range of light intensity with continual darkening throughout the 360° rotation all the way to complete blackout.

Though a disk-shaped neutral density element is the preferred geometry, other geometries may be suitable depending upon the particular application such as a rectangular neutral density element (or elements). For example, in FIG. 8, a rectangular neutral density element 150 has a clear section 152 and a gradually increasing neutral density section 154. By rotation of a drive element 158, the rectangular neutral density filter 150 is moved from side to side to provide the desired amount of attenuating filter medium in the light path. The element 150 includes a douser section 156 on the end opposite the clear section 152. The douser section 156 is an opaque section providing for complete light shutoff. Though the douser 156 is shown mounted to move with the neutral density filter section 154, it may be mounted separately and be moved into the light path at the appropriate time. Such a design may reduce the overall length of the element 150 by an amount corresponding to the length of the douser 156.

If side to side attenuation variation becomes undesirable, a dual rectangular filter design may be employed as illustrated in FIG. 9. A first rectangular neutral filter 160 having a clear section 162, a douser section 165 and a gradually linearly increasing neutral density filter 164. The filter 160 is positioned in the light path with its clear section 162 on the right side of the outgoing light. A second rectangular neutral density filter 170 is positioned adjacent the first rectangular neutral density filter 160. The second rectangular neutral density filter 170 has a clear section 172, a douser section 175 and a linearly increasing neutral density section 174. The clear section 172 of the second rectangular filter 170 is positioned on the left side of the aperture. The position of the first rectangular filter 160 is changed by rotation of shaft 166 and gear 168. A conventional rack and pinion system may be provided to accomplish the desired movements. The shaft 176 and gear 178 control the position of the second rectangular neutral density filter 170, rotating it in the opposite directions to provide a balanced summation of attenuation of light passing through the two rectangular neutral density filters 160, 170.

Thus, an apparatus and method for varying the intensity of light have been shown and described. Though certain examples and advantages have been disclosed, further advantages and modifications may become obvious to one skilled in the art from the disclosures herein. The invention therefore is not to be limited except in the spirit of the claims that follow.

What is claimed is:

1. An apparatus for providing variable intensity light comprising a light source;

an outgoing aperture;

a reflector positioned adjacent the light source directing light from the light source along an outgoing light path through the outgoing aperture;

a primary filter having a portion aligned in the outgoing light path, the primary filter comprising a neutral density section having a density which increases from a given low density at a first side of the neutral density section to a selected higher density at second side of the neutral density section, the primary filter being movable via an actuator to locate a selected portion of the filter in the outgoing light path;

a blocking shroud selectively movable into position in the outgoing light path, wherein the blocking shroud is operably movable via said actuator by which the primary filter is moved.

2. An apparatus for providing variable intensity light according to claim 1 wherein the primary filter comprises a first circular disk positioned in a plane generally perpendicular to the outgoing light path, the first circular disk having (a) a clear arcuate section and (b) a variable density arcuate section of gradually increasing in density from a given first density at an interface with the clear arcuate section to a selected higher density at an opposite end of the second neutral density section.

3. An apparatus for providing variable intensity light according to claim 1 wherein the primary filter comprises a rotatable circular disk positioned in a plane generally perpendicular to the outgoing light path, the circular disk having (a) a clear arcuate section and (b) a variable density arcuate section which is continuously variable, gradually increasing in density extending from a first edge of the clear arcuate section to a second edge thereof.

4. An apparatus for providing variable intensity light according to claim 3 further comprising a motor, a transmission driven by the motor, and a shaft rotationally driven by the transmission, wherein the circular disk is concentrically mounted to the shaft whereby operation of the motor rotates the circular disk about a central axis of the circular disk.

5. An apparatus for providing variable intensity light according to claim 4 wherein the blocking shroud is mounted on the shaft and held stationary untl the primary filter has reached a position of maximum density in the outgoing light path, the blocking shroud only then being movable into position in the outgoing light path.

6. An apparatus for providing variable intensity light according to claim 3 wherein the clear arcuate section comprises an arc of about 90°.

7. An apparatus for providing variable intensity light according to claim 3 wherein the variable density arcuate section comprises an arc of about 270°.

8. An apparatus for providing variable intensity light according to claim 1 wherein the primary filter comprises a rotatable circular disk positioned in a plane generally perpendicular to the outgoing light path with an arcuate section interposed in the outgoing light path, the circular disk having (a) a clear arcuate section and (b) a variable density arcuate section which is continuously variable, gradually increasing in density from a low density at a first polar position at an interface with the clear arcuate section to a higher density at a polar position distal from the interface.

9. An apparatus for providing variable intensity light according to claim 8 further comprising a secondary movable filter positioned in series with the primary filter, the secondary filter comprising a first clear section and a second neutral density section, the second neutral density section being continuously variable, gradually increasing in density from a near zero density at a first end of the neutral density section at an interface with the first clear section to a selected higher density at second end of the second neutral density section distal from the interface, wherein the secondary neutral density filter being generally color neutral, wherein the primary and secondary filters are movable in opposite directions so as to achieve in summation therethrough balanced attenuation throughout a width of the light path.

10. An apparatus for providing variable intensity light according to claim 1 further comprising a diffuser positioned in the outgoing light path downstream of the primary filter.

11. An apparatus for providing variable intensity light according to claim 1 wherein the primary filter comprises a rectangular filter element having (a) a clear section and (b) a variable density section of gradually increasing density extending from a first edge at the clear section to a second edge of the variable density section.

12. An apparatus for providing variable intensity light according to claim 1 further comprising a second diffuser in the outgoing light path downstream of the primary filter.

13. An apparatus for providing variable intensity light according to claim 1 further comprising a color correcting optical filter, wherein the color correcting optical filter comprises a circular disk having (a) a clear arcuate section and (b) a variable density arcuate section of gradually increasing color correcting property extending from a first edge of the clear arcuate section to the other edge thereof.

14. An apparatus for providing variable intensity light according to claim 1 wherein the blocking shroud is held stationary until the primary filter has reached a position of maximum density in the outgoing light path, the blocking shroud only then being movable into position in the outgoing light path.

15. An apparatus for providing variable intensity light comprising a light source;

an outgoing aperture;

a reflector positioned adjacent the light source directing light from the light source along an outgoing light path through the outgoing aperture;

a primary filter having a portion aligned in the outgoing light path, the primary filter comprising a neutral density section having portions of different densities, the primary filter being movable to locate a selected portion of the filter in the outgoing light path;

a blocking shroud selectively movable into position in the outgoing light path, wherein the neutral density filter comprises a rotatable circular disk positioned in a plane generally perpendicular to the outgoing light path, the circular disk having (a) a clear arcuate section and (b) a variable density arcuate section, wherein the circular disk is mounted on a shaft, and wherein the blocking shroud comprises an arcuate section mounted on the shaft, the arcuate section of the blocking shroud being rotatable into a position in the outgoing light path to completely block off any light from passing through the outgoing aperture.

16. An apparatus for providing variable intensity light according to claim 15 wherein the arcuate section of the blocking shroud comprises about a 120° arc.

17. An apparatus for providing variable intensity light according to claim 15 wherein the blocking shroud is held stationary until the primary filter has reached a position of maximum density in the outgoing light path, the blocking shroud only then being movable into position in the outgoing light path.

18. An apparatus for providing variable intensity light according to claim 15 wherein the arcuate section of the blocking shroud comprises a baffle for inhibiting bypass of light.

19. A variable intensity light for motion picture photography, comprising a frame;

a light source supported by the frame;

a rectangular outgoing aperture;

a reflector mounted to the frame and positioned adjacent the light source directing light from the light source along an outgoing light path through the outgoing aperture;

a primary filter having a portion aligned in the outgoing light path, the primary filter comprising a neutral density section having a density which increases from a given low density at a first side of the neutral density section to a selected higher density at second side of the neutral density section, the primary filter being movable via an actuator to locate a selected portion of the filter in the outgoing light path;

a blocking shroud selectively movable into position in the outgoing light path, wherein the blocking shroud is operably movable via said actuator by which the primary filter is moved.

20. A variable intensity light for motion picture photography according to claim 19 wherein the blocking shroud is held stationary until the primary filter has reached a position of maximum density in the outgoing light path, the blocking shroud only then being movable into position in the outgoing light path.

21. A movie camera system having a camera housing with a picture recording mechanism, a lens system including a lens focusing mechanism, and a lighting system, the lighting system comprising a light source;

an outgoing aperture;

a reflector positioned adjacent the light source directing light from the light source along an outgoing light path through the outgoing aperture;

a primary filter having a portion aligned in the outgoing light path, the primary filter comprising a neutral density section having a density which increases from a given density at a first side of the neutral density section to a selected higher density at second side of the neutral density section, the primary filter being movable via an actuator to locate a selected portion of the filter in the outgoing light path;

a blocking shroud selectively movable into position in the outgoing light path, wherein the blocking shroud is operably movable via said actuator by which the primary filter is moved; and a diffuser positioned in the outgoing light path downstream of the primary filter.

22. A movie camera according to claim 21 further comprising a motor for moving the primary filter and a controller in communication with the motor and with the lens focusing mechanism wherein the controller regulates operation of the motor in response to adjustment of the lens focussing mechanism.

23. A movie camera system according to claim 21 wherein the primary filter comprises a circular disk rotatably mounted on a shaft and positioned in a plane generally perpendicular to the outgoing light path, the circular disk having (a) a clear arcuate section and (b) a variable density arcuate section of gradually increasing density extending from a first edge of the clear arcuate section to a second edge thereof.

24. A movie camera system according to claim 23 further comprising a motor, a transmission driven by the motor, and a shaft rotationally driven by the transmission, wherein the primary filter is operatively connected to the shaft whereby operation of the motor adjusts a rotational position of the primary filter for varying alignment of the primary filter placing a selectively higher or lower density section in the outgoing light path.

25. A movie camera system according to claim 24 further comprising a controller in communication with the motor and with the lens focusing mechanism wherein the controller regulates operation of the motor in response to adjustment of the lens focusing mechanism.

26. A movie camera system according to claim 21 further comprising a color correcting filter disposed in the outgoing light path.

27. A movie camera system according to claim 21 wherein the blocking shroud is held stationary until the primary filter has reached a position of maximum density in the outgoing light path, the blocking shroud only then being movable into position in the outgoing light path.

28. A movie camera system having a camera housing with a picture recording mechanism, a lens system including a lens focusing mechanism, and a lighting system, the lighting system comprising a light source;

an outgoing aperture;

a reflector positioned adjacent the light source directing light from the light source along an outgoing light path through the outgoing aperture;

a primary filter having a portion aligned in the outgoing light path, the primary filter comprising a neutral density section which increases from a given density at a first side of the neutral density section to a selected higher density at a second side of the neutral density section, the primary filter being movable to locate a selected portion of the filter in the outgoing light path;

a blocking shroud selectively movable into position in the outgoing light path; and a diffuser positioned in the outgoing light path downstream of the primary filter, wherein the primary filter comprises a circular disk rotatably mounted on a shaft and positioned in a plane generally perpendicular to the outgoing light path, the circular disk having (a) a clear first arcuate section and (b) a second arcuate section comprising the neutral density section;

wherein the blocking shroud comprises an arcuate section mounted on the shaft, the arcuate section of the blocking shroud being rotatable into a position in the outgoing light path to completely block off the outgoing aperture.

29. A method of varying the intensity of light from a light source for use in motion picture photography comprising the steps of:

generating light from a light source;

directing light from the light source along an outgoing light path and through a section of a movable filter, the movable filter having sections of different light transmission properties;

varying the light intensity by moving the filter to selectively position in the outgoing light path a section of the filter having a desired density;

selectively blocking off the light entirely by moving a douser of opaque material in the outgoing light path, the douser and the filter being movable by a common actuating mechanism.

30. A method of claim 29 further comprising passing the light through a diffuser after having passed the light through the filter.

31. A method of claim 29 further comprising holding the douser stationary until the filter has reached a position of maximum density in the outgoing light path before moving the douser into position in the outgoing light path.

* * * * *